Oct. 3, 1939.  E. FRIEDMANN ET AL  2,175,114
ARRANGEMENT FOR TAKING PARALLACTIC PANORAMA STEREOGRAMS
Filed Dec. 15, 1936
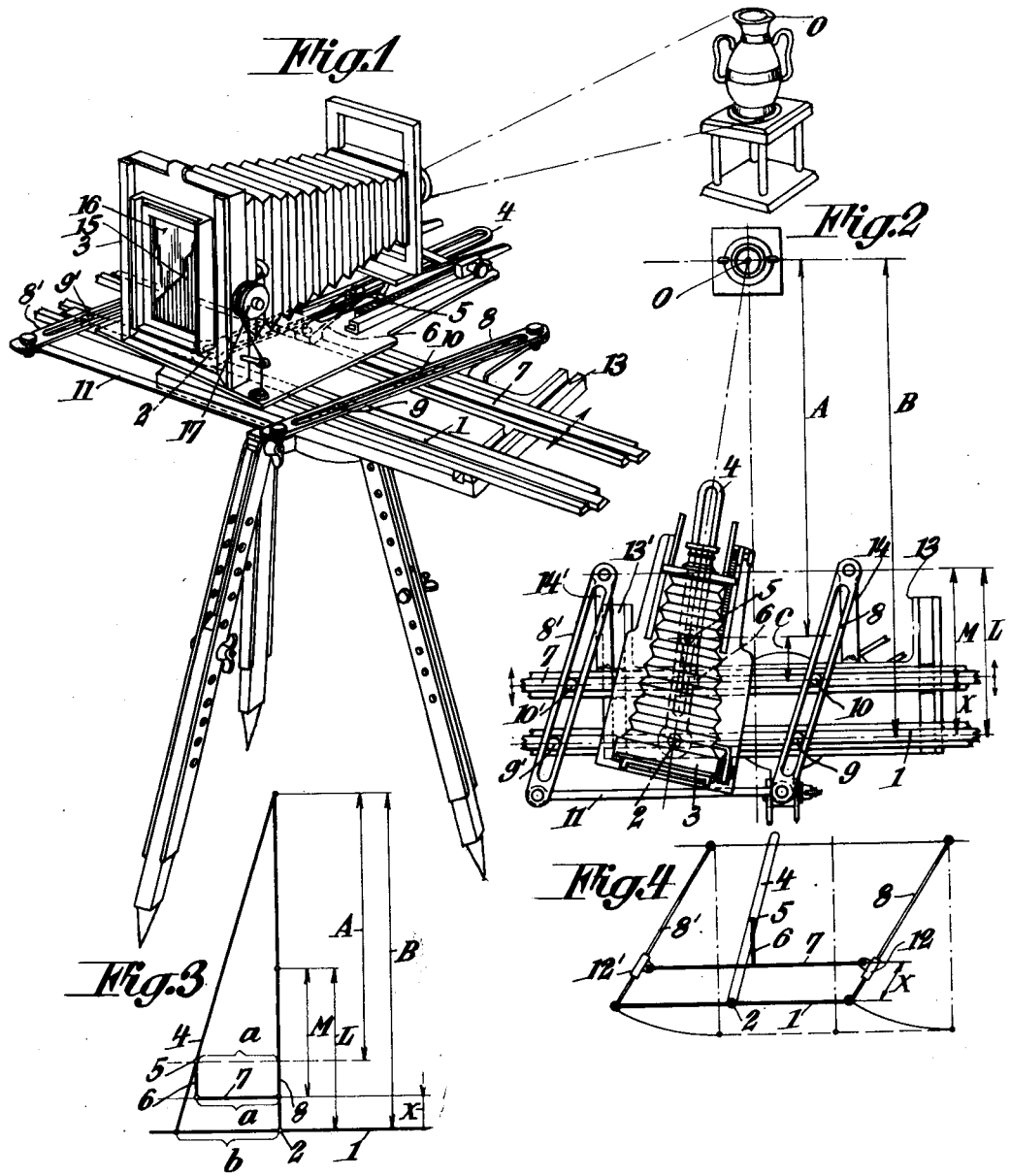
E. Friedmann
& O. Reiffenstein
Inventors
By: Glascock Downing & Seebold
Attys.

Patented Oct. 3, 1939

2,175,114

UNITED STATES PATENT OFFICE 2,175,114

ARRANGEMENT FOR TAKING PARALLACTIC PANORAMA STEREOGRAMS

Ernst Friedmann and Bruno Reiffenstein, Vienna, Austria

Application December 15, 1936, Serial No. 116,028
In Austria December 18, 1935

3 Claims. (Cl. 95—18)

Heretofore, in order that one is not bound to a certain place of viewing when taking so-called parallactic stereograms, it has been proposed to make the impermeable lines of the viewing screen considerably broader than the transparent lines, so that these lines may cover not only an image of lines which corresponds to the visible image of lines and only is parallactically shifted, but also cover a whole system of such images of lines, which correspond to the same number of different directions of viewing the taken object.

In order to produce stereograms of this kind it is already known to cause the stereoscopic change of the image by taking the picture of the object by means of a concave mirror and, if desired, the same is transmitted to the photographic camera by an interposed movable plane mirror. In this case a screen with narrow transparent lines and broad impermeable lines is shifted in front of the photographic plate in accordance with the rocking of the plane mirror closely in front of the photographic plate.

This mode of producing panoramic stereograms calls for an expensive concave mirror and therefore this mode is limited to a certain distance of the article.

Further it is already known to take directly the stereograms in such manner, that the camera-lens and the photographic plate are shifted with respect to one another and to the object and that the screen of lines is arranged immovable a suitable distance away from the photographic plate. In this case, the image is divided into closely adjoining stripes or lines by the parallax in view of the distance between the screen and the plate. In this arrangement, which however is not bound to a certain distance of the object, the distance of the screen from the plate must be suited to the present width of adjustment or the image-angle between the outermost photographic positions or this image-angle at a fixed screen-distance of the width of adjustment, so that the modes of photographing are very intricate.

Further the screen may be arranged directly in front of the light-sensitive layer and, during the movement of the apparatus from one outermost position to the other outermost position, the same is shifted for the distance of a screen line by mechanical agents which are controlled by the movement of the apparatus. Another mode of producing parallactic stereograms consists in simultaneously photographing the object by a number of cameras, which are directed towards the object from different image-angles.

When making stereograms with a screen arranged in front of the photographic plate at a parallactic operative distance it is already known to shift by mechanical means the lens and the plate-frame with respect to one another and with respect to the object to be photographed in such manner that during the movement, every so-called main ray, passing from the object through the optic middle of the lens, always meets the same place of the screen.

The arrangement for carrying out this object consists of guides for the lens-support and for the plate-frames and of a single armed lever provided with two links, one of said links operating the lens-support, while the other link operates the plate-frames. The pivot of the lever is disposed at the same normal distance from the guide of the plate-frame as corresponds to the object to be photographed. The pivots of the links of the lens-support and of the plate-frames are disposed from the lever-pivot the same distance as the lens or plate are distanced from the object. However for somewhat longer distances of the object a long lever provided with a convenient locking device for its pivot-bearing is necessary for this arrangement. A number of pivot-bearings may be arranged on the lever in order to satisfy different object-distances. The known arrangements possess two drawbacks. Firstly, the lever for shifting the camera must be at least so long than corresponds to the object-distance or the object-distance must not be greater than corresponds to the length of the lever. Secondly when shifting the camera, always a ray of light passing from one and the same point of the object to be photographed through the optical centre of the lens strikes one and the same point of the sensitised layer, but this ray is inclined to a greater or smaller extent with respect to the optical axis of the lens according to the position of the camera at the time of photographing. Even the best lenses show deviations in the picture of the point, when its main ray passes through the optical axis of the lens one time at a greater and another time at a smaller angle of inclination. However when viewing the parallax-stereograms produced in this way, the same show a certain unquiteness, because the point, although in the space it ought to appear at a still-stand, will jump about if the stereogram is viewed from different angles or directions.

The two drawbacks above mentioned are removed according to the present invention and, the essential feature of the present invention consists in the provision of adjustable mechanical means acting on the position of the camera in any position of photographing, the mechanical means being adjusted in such manner that in any position of the camera its optical axis passes through one and the same point, and taking a single photograph from the different places whereby said means are rendered operative.

The invention is illustrated by way of example on the accompanying sheet of drawings in which Fig. 1 is a perspective view of an arrangement for taking panorama-stereograms with a camera mounted thereon. Fig. 2 is a plan view on a larger scale of the arrangement shown in Fig. 1. Fig. 3 is diagrammatic view explaining the operation of the arrangement. Fig. 4 is a diagrammatic view of a modified construction of the arrangement.

In Fig. 1, a slotted lever 4 is mounted rotatable on the pivot 2 of a straight slide 1 and is engaged by a pin 5. The camera 3 is connected in convenient manner with the lever 4 in such a way, that its optical axis passes parallel with respect to the direction of the lever. The pin 5 is attached to the cantilever 6 of a slide 7, which is disposed parallel with respect to the slide 1. The slides 1 and 7 are moved parallel by slotted levers 8, 8', which are engaged by pins 9, 10 and 9', 10' respectively. The levers 8, 8' are connected by a link 11 in order to positively guide the former. The forward ends of the levers 8, 8' are pivoted to fixed arms 14 and 14' respectively.

The pin 5 is disposed at a certain invariable distance C from the imaginary line connecting the pins 10, 10' of the slide 7. The slide 7 may be adjusted in guides 13, 13' parallel to itself along the levers 8, 8'.

The arrangement operates in the manner shown in Fig. 3. In Figs. 2 and 3 designate L the operative length of the lever 8 from the slide 1, M the operative length of this lever from the slide 7, C the operative length of the cantilever 6, B the distance of the object to be photographed and A the distance of said object from the pin 5. The slide 7 moves the distance $a$, if the rail 1 and thus the camera, mounted rotatable around the pivot 2 of said rail, are shifted laterally to the extent of the distance $b$. Therefore $$\frac{b}{a}=\frac{L}{M}$$

Thereby the pin 5 also moves the distance $a$, and therefore $$\frac{b}{a}=\frac{B}{A}$$

thus $$\frac{B}{A}=\frac{L}{M}$$

The distance X, which the slide 7 has to be distanced from the slide 1 if the object is removed from the slide 1 to the extent of the distance B, is obtained in the following way: $A=B-(C+X)$, $M=L-X$. If these values for A and M are inserted in the equation $$\frac{B}{A}=\frac{L}{M}$$

the equation $$X=\frac{CL}{B-L}$$

is obtained.

Instead of obtaining the adjustment X in accordance with this formula from the lever-length L of the cantilever-length C and the distance B of the object, the same may be obtained also in the following way: The camera is focussed in the medium position to be photographed and a prominent point of the image is marked on the opaque glass. Now the camera is turned and the slide 7 is shifted until the image-point again coincides with the marked place.

The arrangement illustrated in Figs. 1 and 2 may be varied in many ways, for instance as shown in Fig. 4, the slide 1 and the levers 8, 8' are connected to a link-parallelogram. The slide 7 together with the cantilever 6 is hinged to slides 12, 12', which are adjustable on the levers 8, 8' and are adapted to be fixed in the desired position.

For setting the distance X on the levers 8, 8', a graduation may be provided which beginning on the slide 1 for the distance B of the object yields at the lever-pivots the value $B=L+C$ for the shortest object-distance possible. Stereograms never are made at an infinite object-distance but always at a greater distance than corresponds to the lever-length plus the cantilever-length, in practice substantially 1¼ lever-length, and therefore the slide 7 need never to coincide with the slide 1 or with the lever-pivots. Instead of varying the distance X of the slides 1 and 7, also the operative distance of the pin 5 from the middle line of the slide 7 may be made variable by shifting the cantilever 6 on the slide 7 at a right angle to the same.

In all cases a vertical lines-screen 15 is arranged closely in front of the sensitised emulsion 16, the transparent lines of said screen being considerably smaller than the covered lines. By a mechanical arrangement 17 (micrometer screw, wedge or the like) the screen is shifted in such a manner, that it moves laterally for a line-distance, while the camera is turned from the one extreme position into the other extreme position.

From the negative, produced by the aid of the described arrangement and composed of a number of photographs divided into fine lines and taken from different positions, a positive is copied and the same is covered with a parallax-screen, which essentially is identical with the photograph-screen but possesses a slightly finer division. Thereby the photograph has to be taken already in the desired size of the positive, because the screen-lines would be enlarged if an enlargement is made, so that they do not show the desired fineness anymore and therefore the stereoscopic image would be too rough. Parallax-stereograms used for instance for buffing objects ought to be of a size of at least of 7 by 10 inches and therefore it would be necessary to take the photographs by a big unhandy camera. This drawback is overcome according to the present invention by dividing the screen when making the positive and not already when photographing. According to the present invention, for instance twelve individual photographs are taken without screen by the camera 3 (Figs. 1 and 2) which may be of a considerably smaller size than the desired positive. The photographs may be made on a film-band which is fed forward to the extent of the width of a picture after each photograph is taken. During every exposure, the film-band is perforated by a punching device connected with the camera, so that the individual pictures are provided with fitting holes by which, subsequently, they may be brought to coincide in such a way, that the object-point disposed in the optical axis is shown exactly at the same place. However also a perforated film-band may be employed in combination with a feed-device located in the camera, like in a kinematographic camera. Hereafter the negatives, produced in this way, are projected in succession by a fixed enlarging apparatus on to the layer on which it is intended to produce the positive, this being carried out by fitting pins which engage the perforations in identical positions. A lines-screen is placed in front of the positive-plate. For instance if, as above described, twelve photographs are taken, the impermeable lines of the said screen will be eleven times as broad as the transparent lines. After each projection the screen is shifted by a micrometer screw or the like for the width of a transparent line, so that twelve systems of image-lines are produced, each system corresponding to a photograph taken from another position of the camera. Now this lines-image is covered in known manner by a parallax-screen. This new mode of producing positive stereograms is adapted also for instantaneous photographs. For this object, the individual photographs are made not successively but simultaneously by a corresponding number of cameras.

What we claim is—

1. An arrangement for taking parallactic panorama-stereograms comprising in combination a guide disposed transversely with respect to the object to be photographed, a camera rotatably secured to said transverse guide, links attached to said transverse guide for shifting said guide, the pivot of each link being disposed between the camera and the object to be photographed, a guide-rail pivoted to said transverse guide and directed towards the object to be photographed, a guide disposed parallel adjustable with respect to said transverse guide between the pivots of said links and said transverse guide, a cantilever secured to said parallel guide and pivotally connected with said guide-rail, said camera being connected with said guide-rail so that the optical axis of the lens of the camera passes in the direction of the said guide-rail, a photographic layer in said camera, a lines-screen directly in front of said photographic layer and furnished with narrow transparent lines and with broad non-transparent lines which alternate with said transparent lines, and adjusting means in said camera for shifting the lines-screen with respect to said photographic layer and in accord with the movement of said camera.

2. An arrangement as claimed in claim 1 in which the transverse guide and the parallel guide are adjustable in a straight line independent from the links.

3. An arrangement as claimed in claim 1 in which the transverse guide and the parallel guide are hinged to the links, so that they describe the arc of a circle when rocking the links but remain parallel with respect to one another.

ERNST FRIEDMANN.
BRUNO REIFFENSTEIN.